(12) United States Patent
Onda et al.

(10) Patent No.: US 8,403,735 B2
(45) Date of Patent: Mar. 26, 2013

(54) AUTOMOTIVE AIR CONDITIONER

(75) Inventors: Masaharu Onda, Saitama (JP); Ryuji Tsukuda, Saitama (JP); Hiromichi Yanashima, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 1246 days.

(21) Appl. No.: 12/213,948

(22) Filed: Jun. 26, 2008

(65) Prior Publication Data

US 2009/0068939 A1    Mar. 12, 2009

(30) Foreign Application Priority Data

Jun. 28, 2007 (JP) ................................. 2007-170353

(51) Int. Cl.
*B60H 1/02* (2006.01)
(52) U.S. Cl. ......... 454/160; 454/143; 454/145; 454/152
(58) Field of Classification Search .................. 454/121, 454/145–161
See application file for complete search history.

(56) References Cited

U.S. PATENT DOCUMENTS

| | | | | |
|---|---|---|---|---|
| 5,062,352 A * | 11/1991 | Ostrand | ......................... | 454/121 |
| 5,676,595 A * | 10/1997 | Sumiya et al. | ................. | 454/121 |
| 6,032,723 A * | 3/2000 | Tsuihiji et al. | ................... | 165/42 |
| 6,419,006 B1 * | 7/2002 | Loup et al. | ....................... | 165/42 |
| 6,463,998 B1 * | 10/2002 | Shindo | .......................... | 165/204 |
| 6,482,081 B2 * | 11/2002 | Vincent et al. | ................. | 454/121 |
| 6,595,276 B2 * | 7/2003 | Bendell et al. | ................. | 165/202 |
| 6,652,372 B2 * | 11/2003 | Muller | .......................... | 454/159 |
| 6,749,008 B2 * | 6/2004 | Kawauchi et al. | ............... | 165/42 |
| 6,881,140 B2 * | 4/2005 | Le | ................................. | 454/156 |
| 7,108,599 B2 * | 9/2006 | Kachi | .......................... | 454/121 |

(Continued)

FOREIGN PATENT DOCUMENTS

DE    10161997    6/2003
EP    1219477    7/2002

(Continued)

OTHER PUBLICATIONS

Communication of a Notice of Opposition dated Oct. 13, 2010 issued in European Patent Application No. 08159123.2-2423 corresponding to present U.S. application.

(Continued)

*Primary Examiner* — Steven B McAllister
*Assistant Examiner* — Jamil Decker
(74) *Attorney, Agent, or Firm* — Wenderoth, Lind & Ponack, L.L.P.

(57) ABSTRACT

An automotive air conditioner includes an air-conditioning case in which air passageways having a cold air path via an evaporator, a warm air path via a heater core, and a plurality of discharge path systems communicating with outlets, respectively, are formed. An air mix door distributes cold air and warm air by an opening degree to each of the discharge path systems via a junction region of the cold air and the warm air, and a rotary door having a cross wall is rotatably disposed in the junction region of the cold air and the warm air and blocks air flow from the junction region to the downstream side by the cross wall in an advanced position. The rotary door and the air mix door include an overlap layout which uses a door space inside the cross wall of the rotary door in the advanced position as an opening and closing operation space of the air mix door.

11 Claims, 11 Drawing Sheets

U.S. PATENT DOCUMENTS

| | | | |
|---|---|---|---|
| 7,281,574 B2 * | 10/2007 | Shibata et al. | 165/203 |
| 7,464,749 B2 * | 12/2008 | Okumura et al. | 165/204 |
| 7,540,321 B2 * | 6/2009 | Simmet et al. | 165/203 |
| 7,699,096 B2 * | 4/2010 | Naruse et al. | 165/202 |
| 2001/0012756 A1 | 8/2001 | Komowski | |
| 2002/0129931 A1 * | 9/2002 | Nagata et al. | 165/202 |
| 2002/0139513 A1 * | 10/2002 | Natsume et al. | 165/42 |
| 2004/0093884 A1 * | 5/2004 | Seki et al. | 62/244 |
| 2005/0118944 A1 * | 6/2005 | Vincent et al. | 454/121 |
| 2007/0062683 A1 * | 3/2007 | Tarukawa | 165/202 |
| 2007/0128999 A1 * | 6/2007 | Komowski | 454/155 |
| 2007/0181295 A1 * | 8/2007 | Masatsugu | 165/202 |
| 2008/0108293 A1 | 5/2008 | Haupt et al. | |
| 2009/0242167 A1 * | 10/2009 | Onda et al. | 165/61 |

FOREIGN PATENT DOCUMENTS

| | | |
|---|---|---|
| EP | 1 247 668 | 10/2002 |
| FR | 2 878 469 | 6/2006 |
| JP | 2001-113931 | 4/2001 |
| JP | 2002-307929 | 10/2002 |
| JP | 2002307929 A * | 10/2002 |
| JP | 2003-154836 | 5/2003 |

OTHER PUBLICATIONS

Communication of Notices of Opposition dated Nov. 4, 2010 issued in European Patent Application No. 08159123.2-2423 corresponding to present U.S. application.
European Search Report mailed Oct. 2, 2008.

* cited by examiner

[VENT mode]

【B/L mode】

[Foot mode]

[D/Foot mode]

[DEF mode]

[B/L mode]

[VENT mode]

US 8,403,735 B2

AUTOMOTIVE AIR CONDITIONER

PRIORITY CLAIM

The present application is based on and claims priority from Japanese Patent Application No. 2007-170353, filed on Jun. 28, 2007, the disclosure of which is hereby incorporated by reference in its entirety.

BACKGROUND OF THE INVENTION

1. Field of the Invention

The present invention relates to an automotive air conditioner which blows out, inside a vehicle, air having a temperature adjusted to a desired temperature by mixing cold air with warm air.

2. Description of the Related Art

There is known a conventional automotive air conditioner in which an air passageway including a cold air path via an evaporator, a warm air path via a heater core, and a plurality of discharge paths which communicates with blowing outlets (def outlet, vent outlet, foot outlet), respectively, is formed inside an air-conditioning case, and cold air and warm air distributed by an opening degree of an air mix door flow to each of the discharge paths via a junction region of the cold air and the warm air (for example, refer to JP2001-113931A).

There is also known a conventional automotive air conditioner configured to reduce the amount of required space for, compared with a structure which provides a rotary door, and configured to prevent disordered air flow (for example, refer to JP2002-307929A). In such an air conditioner, a foot opening formed in the side wall of an air-conditioning case is opened and closed by a foot door made of a plate member.

There is also known a conventional automotive air conditioner configured to reduce a temperature difference between a blowing temperature from a defrost opening and a blowing temperature from a foot opening (for example, JP2003-154836A). In such an automotive air conditioner, a foot opening is opened and closed by a foot door made of a rotary door, and an area of a warm air bypass to a defrost is adjusted.

However, in the conventional techniques described in JP2001-113931A and JP2002-307929A, the air is distributed to the foot outlet by advancing a half of the foot door, so the cold air from the cold air path and the warm air from the warm air path are not sufficiently mixed in the junction region, causing a problem such as a low air-mixing performance.

In the technique described in JP2003-154836A, although the rotary door is described, it is only a pair of narrow rotary doors disposed in both side portions of the vehicle width direction of the air-conditioning case, and the door space of the rotary doors is a closed space. For this reason, the rotary doors described in JP2003-154836A do not have an air-mixing guide performance which encourages the mixing of the cold air and the warm air.

Moreover, since the rotary door is required to be disposed in a position which does not interfere with the movement of the air mix door, the layout of the rotary door and the air mix door is limited. For example, the distance between the shafts of two doors should be maintained at a predetermined distance or more when setting the two doors in the air-conditioning case. In addition, since the door space of the rotary door is not used as an air passageway, it is necessary to retain a necessary air passageway space in the air-conditioning case in addition to the rotary door. As a result, there is a problem in that even if there is a demand for downsizing the air-conditioning case, this demand cannot be met.

SUMMARY OF THE INVENTION

The present invention has been made in view of the above problems, and an object of the present invention is to provide an automotive air conditioner which can meet a demand for downsizing an air-conditioning case while improving an air-mixing performance of cold air and warm air.

In order to achieve the above object, the present invention relates to an automotive air conditioner, including: an air-conditioning case 22 in which air passageways including a cold air path 28 through an evaporator 26, a warm air path 29 through a heater core 30, and a plurality of discharge path systems 32, 33 communicating with outlets, respectively, are formed; an air mix door 71, 72 which distributes cold air and warm air by an opening degree to each of the discharge path systems 32, 33 via a junction region J of the cold air and the warm air; and a rotary door 31 having a cross wall 31c, 31c, which is rotatably disposed in the junction region J of the cold air and the warm air and blocks air flow from the junction region J to the downstream side by the cross wall 31b in an advanced position, the rotary door 31 and the air mix door 71, 72 including an overlap layout which uses a door space inside the cross wall 31b of the rotary door 31 in the advanced position as an opening and closing operation space of the air mix door 71, 72.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Figure 1:
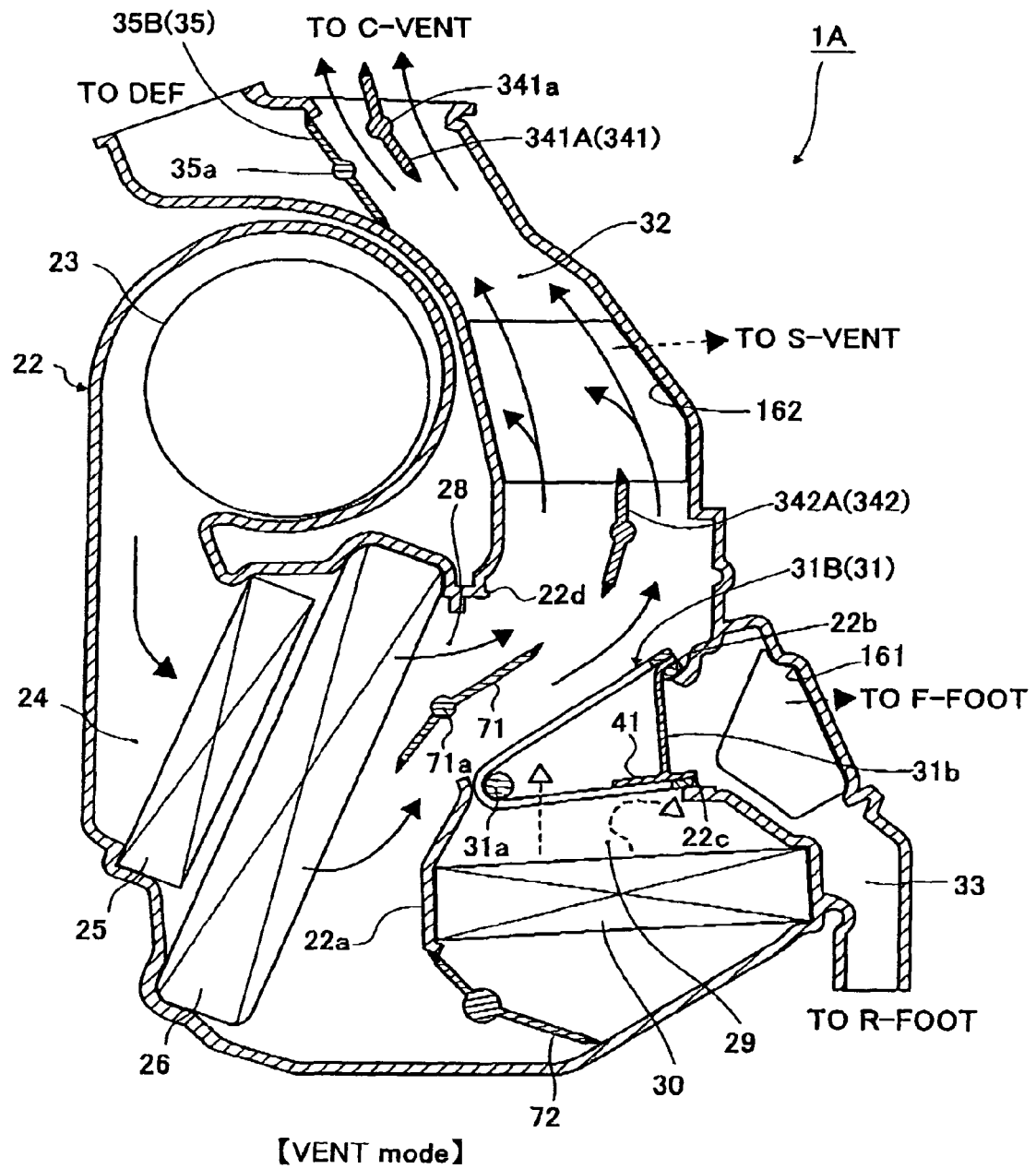
FIG. 1 is a vertical sectional view illustrating a vent mode which blows out air from a center vent outlet and a side vent outlet in an automotive air conditioner of Embodiment 1.

Hereinafter, embodiments of the present invention will be described with reference to the drawings.

Embodiment 1

At first, the structure of Embodiment 1 will be described with reference to FIGS. 1-8.

In an automotive air conditioner 1A according to Embodiment 1, an air passageway is formed by appropriately zoning the inside area of an air-conditioning case made of a systematic resin or the like with a wall 22a or the like. The quality of the air such as the cleanness and the temperature is adjusted by air distribution members (blower 23, introduction path 24) disposed in the upstream positions of this air passageway, functional members (filter 25, evaporator 26, heater core 30, etc.) disposed in the air passageway, a cold air side air mix door 71, and a warm air side air mix door 72. The outlets (blowing modes) of the adjusted air can be changed by opening and closing positions of a center vent door 341, a side vent door 342, a defrost (def) door 35, and a foot door 31.

The air discharged from the blower 23 is cleaned by passing through the filter 25 disposed in the introduction path 24. Moreover, the evaporator 26 constituting a part of a refrigerating cycle is disposed in the latter part (downstream side) of the filter 25, so as to cool down the air. In this case, the filter 25 and the evaporator 26 are disposed at the lower position of the blower 23 to be parallel to each other in the longitudinal direction, and are set in the inclination longitudinal direction such that the upper sides are shifted to the downstream side and the lower sides are shifted to the upstream side from the up and down vertical positions. By setting the filter 25 and the evaporator 26 in this inclination longitudinal direction, the air can be easily introduced from the introduction path 24 and a space can be formed in the lower portion of the evaporator 26.

The upper side of the wall 22a in the downstream side of the evaporator 26 is provided with a cold air path 28 in which the heater core 30 is not disposed and a cold air side air mix door 71 is disposed. The lower side of the wall 22a in the downstream side of the evaporator 26 is provided with a warm air side air mix door 72, and the downstream position of the warm air side air mix door 72 is provided with the heater core 30 and a warm air path 29. In this case, the heater core 30 is disposed in the horizontal direction with the wall 22a as a supporting case portion of one end side. By disposing the heater core 30 in the horizontal direction, the air from the evaporator 26 flows in the bottom face of the air-conditioning case 22, and then flows in the heater core 30 from bottom to top. Thereby, the warm air path 29 becomes a path through which the warm air flows from bottom to top.

Figure 3:
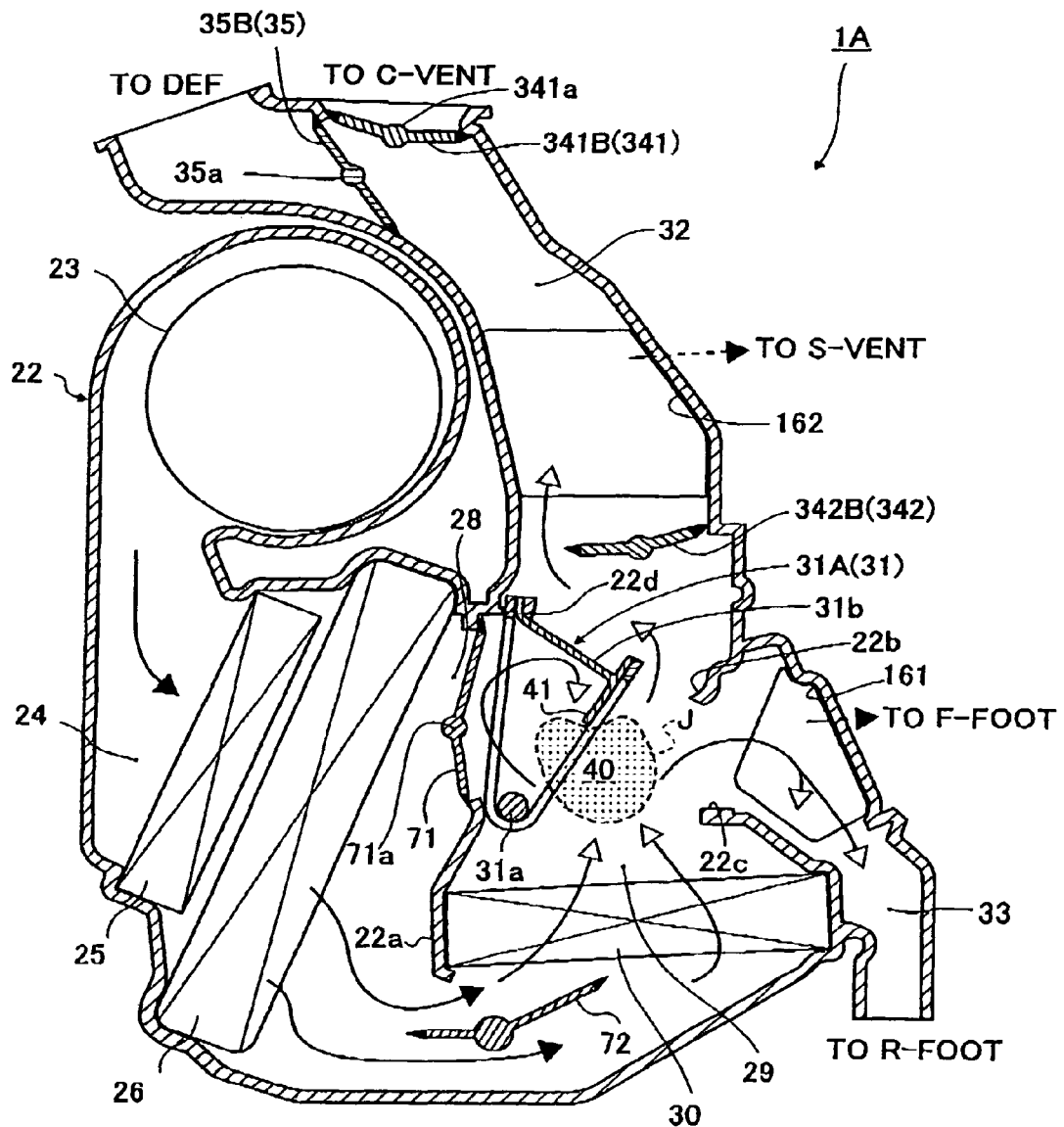
FIG. 3 is a vertical sectional view illustrating a foot mode which blows out air from both of the side vent outlet and the foot outlet in the automotive air conditioner of Embodiment 1.

The air distribution ratio to the cold air path 28 and the warm air path 29 can be changed by an opening degree of each of the cold air side air mix door 71 disposed in the upper position of the wall 22a in the downstream of the evaporator 26 and the warm air side air mix door 72 disposed in the lower position of the wall 22a. More particularly, in Embodiment 1, as illustrated in FIG. 1, when the cold air side air mix door 71 is in the open position and the warm air side air mix door 72 is in the closed position, the air does not flow in the warm air path 29, and only flows in the cold air path 28. On the other hand, as illustrated in FIG. 3, when the cold air side air mix door 71 is in the closed position and the warm air side air mix door 72 is in the open position, the air does not flow in the cold air path 28 and only flows in the warm air path 29.

Figure 2:
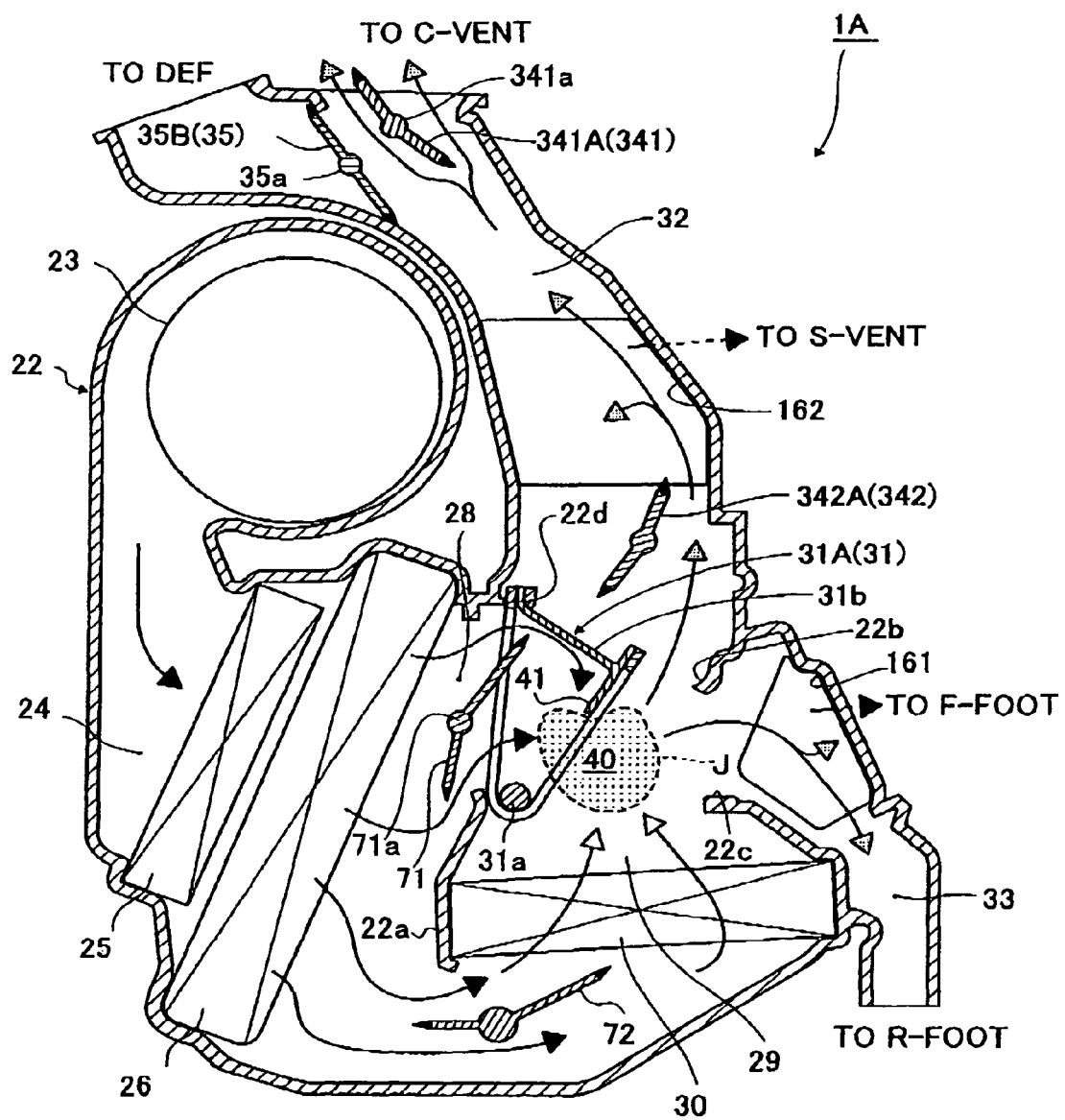
FIG. 2 is a vertical sectional view illustrating a B/L mode which blows out air from both of a vent outlet and a foot outlet in the automotive air conditioner of Embodiment 1.

When the cold air side air mix door 71 is in the midway position as illustrated in FIG. 2, the cold air after passing through the cold air path 28 and the warm air after passing through the warm air path 29 flow together, and the mixing of cold air and the warm air is accelerated in an air mix chamber 40 formed in a position corresponding to a junction region J. After the cold air and the warm air are mixed in the air mix chamber 40, the air is distributed to each of discharge paths 32, 33 and each of discharge openings 161, 162, and blows from each of the outlets (the def outlet (DEF), the vent outlet (C-VENT (center side), S-VENT (side)), and the foot outlet (F-FOOT (front side), R-FOOT (rear side)). The distribution to the discharge paths 32, 33 and the discharge openings 161, 162, and the selection of the outlets are controlled by the center vent door 341, the side vent door 342, the defrost (def) door 35, and the foot door (rotary door) 31. This outlet selection control (=mode selection control) will be described later.

In Embodiment 1, a foot door 31 (rotary door) capable of moving between an advanced position 31A (FIGS. 2, 3, 4) which blocks the downstream side of the junction region J and a withdrawal position 31B (FIGS. 1, 5) which withdraws from the advanced position 31A is disposed in the position of the junction region J of the cold air and the warm air. This foot door 31 is rotatably supported by the air-conditioning case 22, and is a rotary door which rotates about a door shaft 31a provided in the downstream position of the upper portion of the wall 22a of the air-conditioning case 22.

Figure 6:
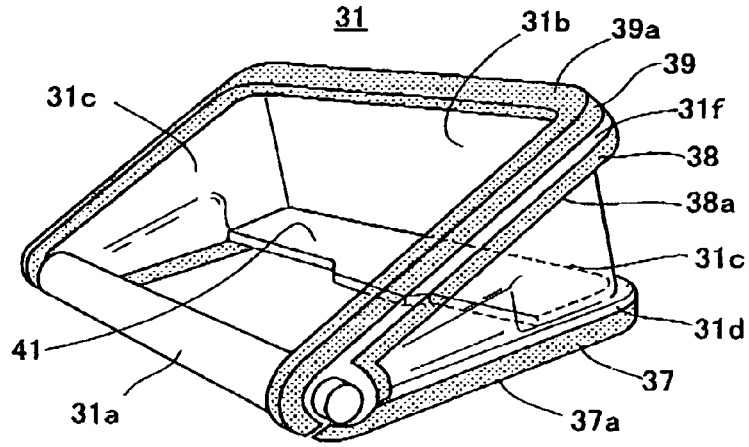
FIG. 6 is a perspective view illustrating a foot door in the automotive air conditioner of Embodiment 1.

As illustrated in FIG. 6, the foot door (rotary) 31 is wedge-shaped and includes a pair of approximately fan-shaped (triangular) side walls 31c, 31c disposed to be parallel to each other, a cross wall 31b which connects the outer circumference edges of the side walls 31c, 31c, and a pair of door shafts 31a projecting in a direction opposite to each other from their respective positions to be the bases of the fan-shaped side walls 31c. Flange frames 31d, 31f each having an approximate U-shape are formed in the side edges of the side walls 31c, 31c and the side edge of the cross wall 31b. A seal member 37 is fastened to the flange frame 31d, and seal members 38, 39 are also fastened to the flange frame 31f.

Figure 5:
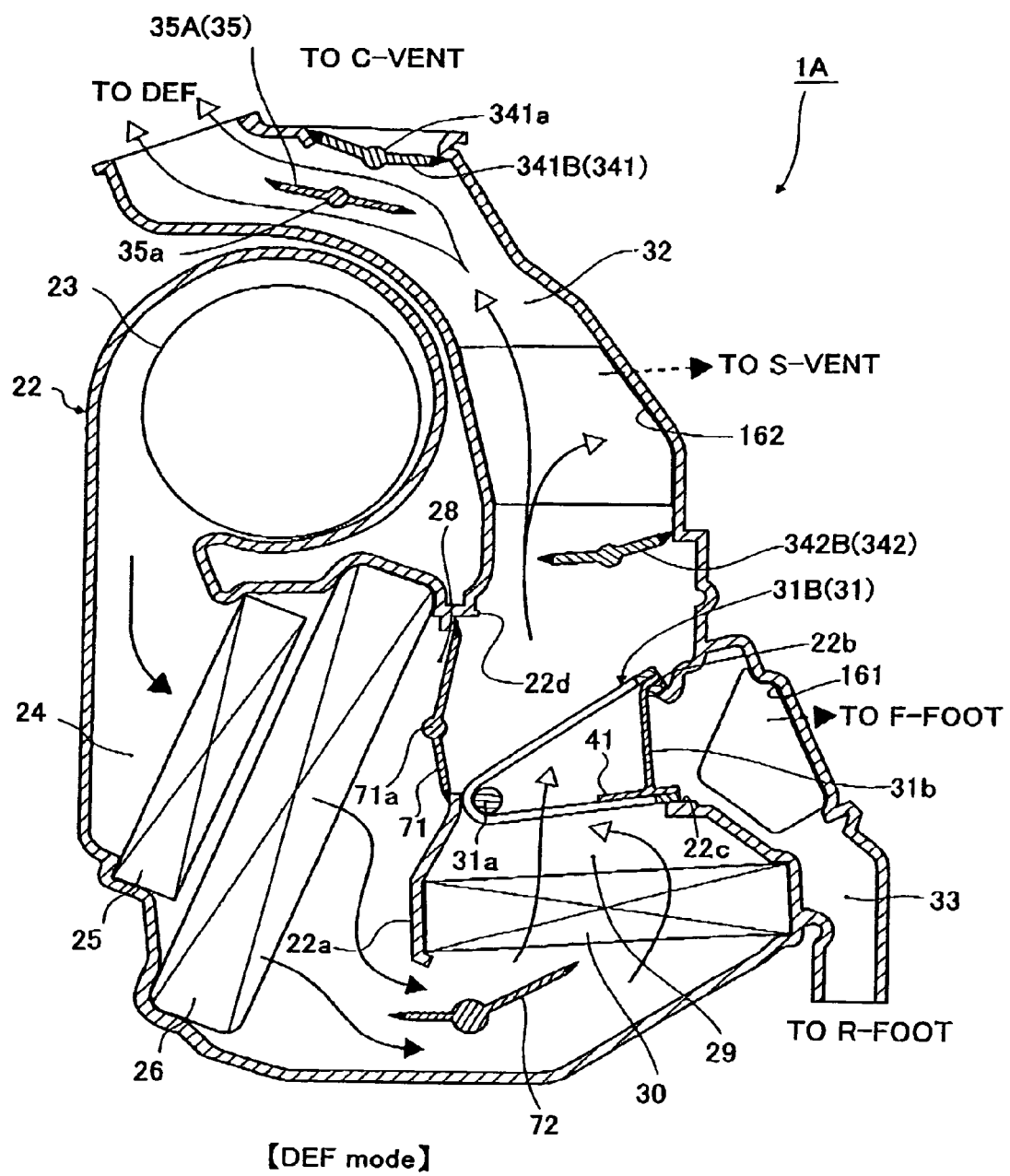
FIG. 5 is a vertical sectional view illustrating a defrost mode which blows out air only from the defrost outlet in the automotive air conditioner of Embodiment 1.

In the withdrawal position 31B of the foot door 31, surfaces 37a, 38a of the seal members 37, 38 contact the surfaces of a first foot opening seal face 22c and a second foot opening seal face 22b of the air-conditioning case 22, respectively, and the sealing performance is retained by the contact portions (FIGS. 1, 5).

Figure 4:
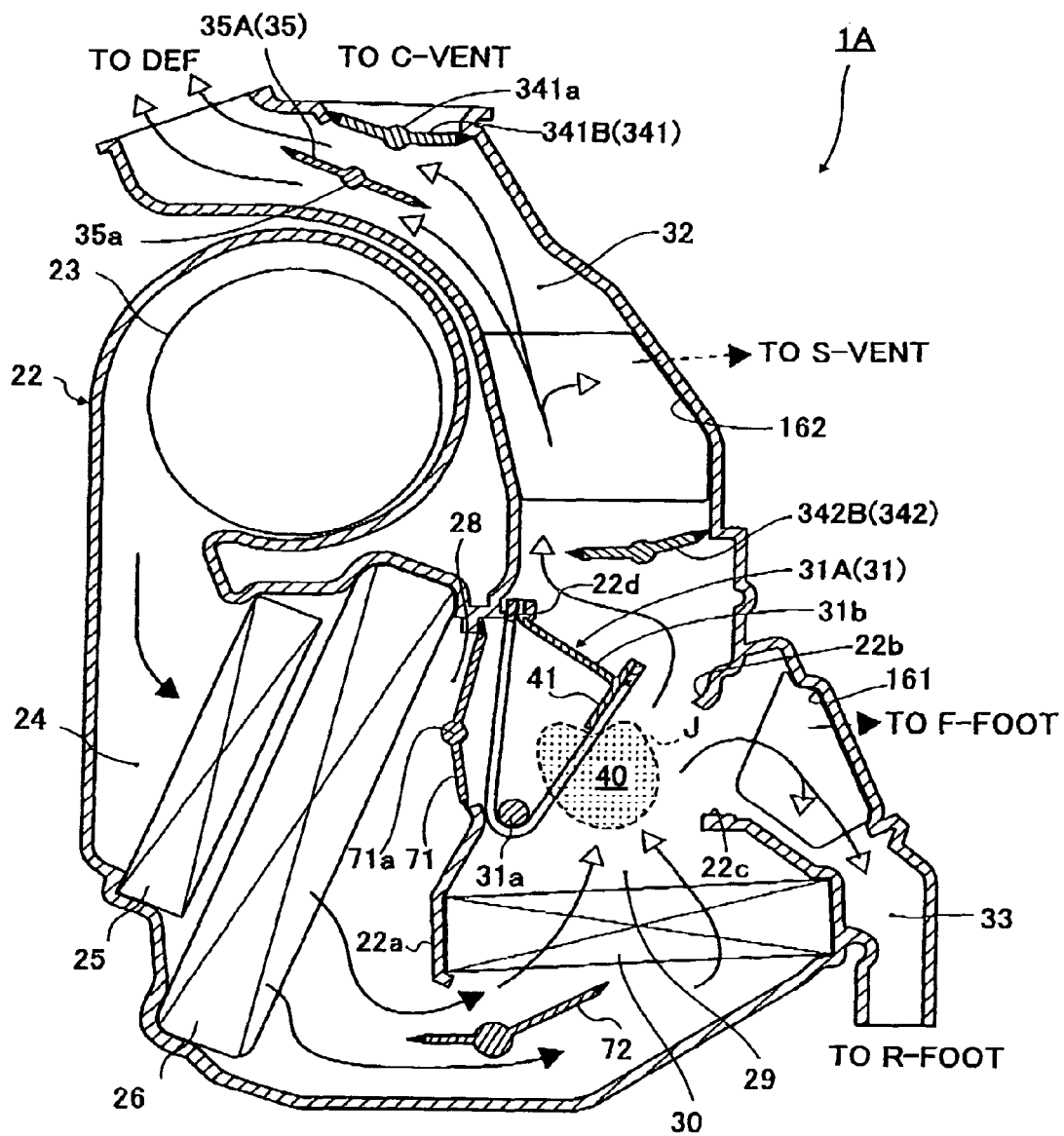
FIG. 4 is a vertical sectional view illustrating a defrost and foot mode which blows out air from both of a defrost outlet and the foot outlet in the automotive air conditioner of Embodiment 1.

In the advanced position 31A of the foot door 31, the surface 39a of the seal member 39 contacts the surface of a door opening seal face 22d of the air-conditioning case 22, so the sealing performance is retained by the contact portion (FIGS. 2, 3, 4).

Figure 7:
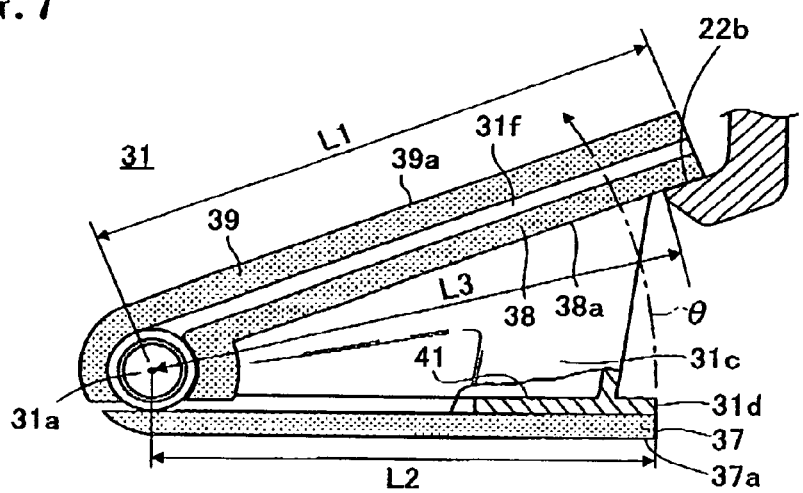
FIG. 7 is a side view illustrating the foot door in the automotive air conditioner of Embodiment 1.

As illustrated in FIG. 7, in the foot door 31, a seal face distance L2 from the door shaft 31a to the cross wall 31b in the end portion of the circumferential direction (the flange frame 31d in the end portion of the circumferential direction) in the front side (the lower side in FIG. 1) of the advanced direction of the foot door 31 is set to be shorter than a seal face distance L1 from the door shaft 31a to the cross wall 31b in the end portion of the circumferential direction (the flange frame 31f in the end portion of the circumferential direction) in the tip side (the upper side in FIG. 1) of the advanced direction of the foot door 31. More particularly, when the distance from the door shaft 31a to the second foot opening seal face 22b is a seal face distance L3, the relationship L1>L3>L2 is established.

Figure 8:
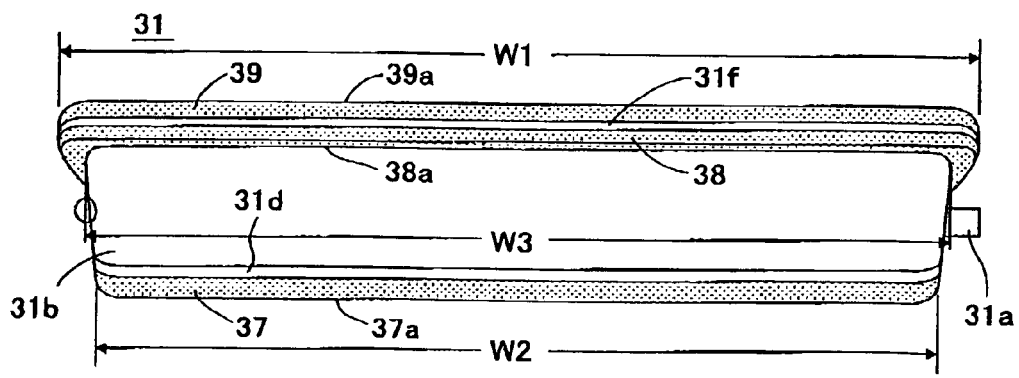
FIG. 8 is a front view illustrating the foot door in the automotive air conditioner of Embodiment 1.

As illustrated in FIG. 8, in the foot door 31, a seal face width W2 in the end portion of the circumferential direction in the front side of the advanced direction of the foot door 31 is set to be shorter than a seal face width W1 in the end portion of the circumferential direction in the tip side of the advanced direction of the foot door 31. More particularly, when the maximum width in the portion of the cross wall 31b is W3, the relationship W1>W3>W2 is established.

As illustrated in FIGS. 1-5, the foot (rotary) door 31 is disposed in the junction region J of the cold air and the warm air, and the cross wall 31b of the rotary door 31 blocks the air flow from the junction region J to the downstream side in the advanced position (door open position).

As illustrated in FIG. 2, the foot door 31 and the cold air side air mix door 71 include an overlap layout which uses the door space inside the cross wall 31b of the foot door 31 in the door open position as the opening and closing operation space of the cold air side air mix door 71.

The cross wall 31b of the foot door 31 blocks the foot discharge path 33 and the foot discharge opening 161 (refer to FIG. 1) in the withdrawal position (closed position), and blocks the air flow from the junction region J to the downstream side, and uses the space inside the cross wall 31b as the cold air path or the warm air path (refer to FIG. 2).

The cold air side air mix door 71 controls the opening area of the cold air path 28, which goes through the evaporator 26, by an opening degree.

As illustrated in FIG. 2, the foot door 31 and the cold air side air mix door 71 are disposed such that a part of the cold air side air mix door 71 by an opening degree on the open side overlaps with the door space surrounded by the door shaft 31a, a pair of the side walls 31c, 31c, and the cross wall 31b of the foot door 31 in the open position (i.e., a portion of the air mix door 71 is located within the door space when the rotary door 31 is in the advanced position of FIG. 2 and the air mix door 71 is open at least a minimal amount as also shown in FIG. 2. More particularly, the door shaft 31a of the foot door 31 and the door shaft 71a of the cold air side air mix door 71 are disposed adjacent to the upper position of the wall 22a.

The downstream position of the heater core 30 is provided with a warm air path blocking plate 41 which blocks a part of the warm air path 29 at least in the withdrawal position (closed position) of the foot door 31. The warm air path blocking plate 41 of Embodiment 1 is integrally formed with the foot door 31 as illustrated in FIGS. 1-5. More particularly, the warm air path blocking plate 41 is provided in a position covering a part of the warm air path area in which the three directions are surrounded by a pair of the side walls 31c, 31c and the cross wall 31b on the front side of the advanced direction of the foot door 31.

Next, the functions will be described.

Hereinafter, the functions of the automotive air conditioner 1A of Embodiment 1 will be described according to "air flow function in each of blowing modes", "air mixing function of cold air and warm air", "downsizing function of air-conditioning case", "increasing function of rotation angle of foot door", and "heat pickup improvement function in full-cool".

[Air Flow Function in Each of Blowing Modes]

In the vent mode (FIG. 1).

In the vent mode selected state in the full cool mode as illustrated in FIG. 1, the cold air side air mix door 71 is opened, and the warm air side air mix door 72 is closed. The foot (rotary) door 31 is located in the withdrawal position (31B) which closes the foot outlet, and the defrost (def) door 35 is located in the closed position (35B) which closes the defrost (def) outlet. The center vent door 341 rotatably supported to the air-conditioning case 22 centering on the door shaft 341a is located in the position 341A which opens the center-vent outlet (C-VENT), and the side vent door 342 is located in the position 342A which opens the side vent outlet (S-VENT).

For this reason, as illustrated in FIG. 1, when the vent mode is selected in the full cool mode, if the cold air after passing through the evaporator 26 passes through the cold air path 28 and the discharge path 32, the cold air blows in the vehicle interior from the center vent outlet (C-VENT). If the cold air after passing through the evaporator 26 passes through the cold air path 28 and the side vent discharge opening 162, the cold air blows in the vehicle interior from the side vent outlet (S-VENT).

In the B/L mode (FIG. 2).

In the B/L mode selected state illustrated in FIG. 2, the cold air side air mix door 71 is in the open side and the warm air side air mix door 72 is in the open side. The foot door 31 is located in the advanced position (31A) which opens the foot outlet, and the def door 35 is located in the position (35B) which closes the def outlet. The center vent door 341 rotatably supported by the air-conditioning case 22 centering on the door shaft 341a is located in the position 341A which opens the center vent outlet (C-VENT), and the side vent door 342 is located in the position 342A which opens the side vent outlet (S-VENT).

For this reason, as illustrated in FIG. 2, when the B/L mode is selected, which blows out the temperature-adjusted air in which the cold air is mixed with the warm air from the vent/foot, the cold air after passing through the evaporator 26 reaches the junction region J after detouring around the inner face of the warm air path blocking plate 41 and past the cross wall 31b of the foot door 31 from the cold air path 28. In other words, the cross wall 31b and warm air path blocking plate 41 impede the flow of air from the junction region J to an area downstream of the junction region 5 including the discharge paths. The warm air after passing through the heater core 30 reaches the junction region J of the front side area of the advanced direction of the foot door 31 from the warm air path 29. This junction region J becomes the air mix chamber 40, and the cold air is mixed with the warm air in the air mix chamber 40, so as to be the temperature-adjusted air.

If the temperature-adjusted air of the air mix chamber 40 passes through the discharge path 32, the temperature-adjusted air blows into the vehicle interior from the center vent outlet (C-VENT), and a part of the temperature-adjusted air blows into the vehicle interior from the side vent outlet (S-VENT) after passing through the side vent discharge opening 162. At the same time, the temperature-adjusted air of the air mix chamber 40 blows into the vehicle interior from the front side foot outlet (F-FOOT) after passing through the foot discharge opening 161, and blows into the vehicle interior from the rear side foot outlet (R-FOOT) after passing through the foot discharge path 33.

In the foot mode (FIG. 3).

In the foot mode selected state as illustrated in FIG. 3, the cold air side air mix door 71 is closed, and the warm air side air mix door 72 is opened. The foot door 31 is located in the advanced position (31A) which opens the foot outlet, and the def door 35 is located in the closed position (35B) which closes the def outlet. The center vent door 341 is located in the closed position 341B which closes the center vent outlet (C-VENT), and the side vent door 342 is located in the position 342B which closes the side vent outlet (S-VENT) (the position which does not completely close the side vent outlet but leaves opens a part thereof).

For this reason, as illustrated in FIG. 3, when the foot mode is selected, which blows out the warm air from the foot outlet, the warm air after passing through the heater core 30 directly or indirectly reaches the junction region J of the front side area of the advanced direction of the foot door 31 from the warm air path 29. The warm air from the junction region J blows into the vehicle interior from the front side foot outlet (F-FOOT) after passing through the foot discharge opening 161, and also blows into the vehicle interior from the rear side foot outlet (R-FOOT) after passing through the foot discharge path 33. In addition, a part of the warm air of the junction region J blows into the vehicle interior from the side vent outlet (S-VENT).

In the def/foot mode (FIG. 4).

In the def/foot mode selected state as illustrated in FIG. 4, the cold air side air mix door 71 is closed, and the warm air side air mix door 72 is opened. The foot door 31 is located in the advanced position (31A) which opens the foot outlet, and the def door 35 rotatably supported to the air-conditioning case 22 centering on the door shaft 35a is located in the position (35A) which opens the def outlet. The center vent door 341 is located in the position 341B which closes the center vent outlet (C-VENT), and the side vent door 342 is located in the position 342B which closes the side vent outlet (S-VENT) (the position which does not completely close the side vent outlet but leaves open a part thereof).

For this reason, as illustrated in FIG. 4, when the def/foot mode is selected, which blows out the warm air from the def/foot, the warm air after passing through the heater core 30 directly or indirectly reaches the junction region J of the front side area of the advanced direction of the foot door 31 from the warm air path 29. The warm air from the junction region J blows into the vehicle interior from the def outlet (DEF) after passing through the space between the foot door 31 and the air-conditioning case 22, the opening space of the side vent door 342, and the discharge path 32. At the same time, the warm air from the junction region J blows into the vehicle interior from the front side foot outlet (F-FOOT) after passing through the foot discharge opening 161, and blows into the vehicle interior from the rear side foot outlet (R-FOOT) after passing through the foot discharge path 33. In addition, a part of the warm air of the junction region J blows into the vehicle interior from the side vent outlet (S-VENT).

In the def mode (FIG. 5).

In the def mode selected state as illustrated in FIG. 5, the cold air side air mix door 71 is closed, and the warm air side air mix door 72 is opened. The foot door 31 is located in the withdrawal position (31B), which closes the foot outlet, and the def door 35 rotatably supported to the air-conditioning case 22 centering on the door shaft 35a is located in the position (35A) which opens the def outlet. The center vent door 341 is located in the position 341B which closes the center vent outlet (C-VENT), and the side vent door 342 is located in the position 342B which closes the side vent outlet (S-VENT) (the position which does not completely close the side vent outlet but leaves open a part thereof).

For this reason, as illustrated in FIG. 5, when the def mode is selected, which blows out the warm air from the def outlet, the warm air after passing through the heater core 30 blows into the vehicle interior from the def outlet (DEF) via the inside of the foot door 31, the opening space of the side vent door 342, and the discharge path 32 from the warm air path 29. In addition, a part of the warm air after passing through the opening space of the side vent door 342 blows into the vehicle interior from the side vent outlet (S-VENT).

[Air Mixing Function of Cold Air and Warm Air]

As illustrated in FIG. 2, the foot door 31 protrudes to the air mix chamber 40 in which the cold air is mixed with the warm air when the foot outlet is opened (when the foot door 31 is located in the advanced position), so the cold air is not mixed with the warm air, and the cold air is prevented from flowing through the vent outlet and def outlet provided in the upper portion of the air-conditioning case 22. Namely, when the foot outlet is opened, the air mix chamber 40 is formed by the foot door 31. In addition, by arranging the warm air path blocking plate 41 in the foot door 31, this warm air path blocking plate 41 provides the function for guiding the cold air to the warm air side, and improves the air mixing performance.

More particularly, in the state in which the foot door 31 is located in the advanced position 31A as illustrated in FIG. 2, the air mix chamber 40, which improves the mixture of the cold air from the cold air path 28 to the junction region J with the warm air from the warm air path 29 to the junction region J, is formed by blocking the air flow from the junction region J to the downstream side with the cross wall 31b and the warm air path blocking plate 41.

For this reason, in the advanced position 31A of the foot door 31, compared with the withdrawal position 31B of the foot door 31, the flow speed of the cold air is significantly reduced, and separation, swirl, damage and the like are caused by the significant change in the flowing direction, and also the path to the blowing outlet is extended. Accordingly, in the air mix chamber 40, the mixture of the cold air from the cold air path 28 to the junction region J with the warm air from the warm air path 29 to the junction region J is improved, and the mixture of the cold air with the warm air is further improved by guiding the cold air to the warm air side (downward) with the warm air path blocking plate 41.

In Embodiment 1, the cold air path 28 and the def outlet (DEF) or the vent outlet (C-VENT, S-VENT) are disposed relatively adjacent to each other. Therefore, by setting the advanced position 31A such that the cross wall 31b and the warm air path blocking plate 41 are disposed between the cold air path 28 and the def outlet (DEF) or the vent outlet (C-VENT, S-VENT), the flow volume in which the cold air from the cold air path 28 directly flows into the def outlet (DEF) or the vent outlet (C-VENT, S-VENT) without mixing with the warm air from the warm air path 29 can be effectively controlled. As a result, the increase in the temperature difference of the blowing air can be controlled between the def outlet (DEF) or the vent outlet (C-VENT, S-VENT) and the foot outlet (F-FOOT, R-FOOT).

As illustrated in FIG. 2, one end (the surface 39a of the seal member 39) on the movement direction side of the cross wall 31b of the foot door 31 is brought into contact with the door opening seal face 22d of the air-conditioning case 22. Thus, the air flowing to the downstream side from the air mix chamber 40 along the door opening seal face 22d is blocked. More particularly, the air flow is blocked to the door opening seal face 22d close to the def outlet (DEF) and the vent outlet (C-VENT, S-VENT), and the air flow is curved to the discharge path 33 far from the def outlet (DEF) and the vent outlet (C-VENT, S-VENT). Thereby, the advantageous effects can be obtained.

[Downsizing Function of Air-Conditioning Case]

The air-conditioning case is disposed in the instrument panel. However, there is a demand for ensuring the space in the vehicle interior by controlling the space occupied by the instrument panel, and a demand for disposing numerous devices inside the panel without changing the space occupied by the instrument panel. In order to respond to the above demands, it is necessary to downsize the air-conditioning case having the highest occupation rate of space. Moreover, there is a strong demand for downsizing the air-conditioning case without reducing the original air-conditioning performance.

On the other hand, in the conventional rotary door, the door space is not used as the opening and closing operation space of the air mix door. For this reason, it is necessary to dispose the rotary door in a position which does not interfere with the operation of the air mix door, so the layout of the two doors is limited when setting the positions of the two doors in the air-conditioning case, for example, the distance between the shafts of two doors should be maintained at a predetermined distance or more. Moreover, in the conventional rotary door, the door space is not used as the air passageway. Therefore, it is necessary to retain the space of the air passageway required for ensuring the air mixing performance in the air-conditioning case, in addition to the rotary door. As a result, although there is a demand for downsizing the air-conditioning case without reducing the air-conditioning performance, this demand can not be met because of the limitation of the layout and the limitation for ensuring the space of the air passageway.

However, in the automotive air conditioner according to Embodiment 1, the foot door 31 and the cold air side air mix door 71 include the overlap layout which uses the door space inside the cross wall 31b of the foot door 31 in the advanced position as the opening and closing operation space of the cold air side air mix door 71. Accordingly, when designing the air-conditioning case 22, the limitation in the layout of the two doors 31, 71 is minimized, the distance between the two door shafts 31a, 71a can be reduced, and the door space of the foot door 31 can be used as the cold air passageway 28. As a result, without reducing the air-conditioning performance (especially, the air-mixing performance), the demand for downsizing the air-conditioning case 22 can be achieved.

[Increasing Function of Rotation Angle of Foot Door]

In order to rotate the rotary door while retaining the sealing performance of the opening portion, it is necessary for the seal face distances from the door shaft to be set such that the lower side of the fan-shaped side wall of the rotary door is short and the upper side of the fan-shaped side wall of the rotary door is long. However, it is necessary to retain not only the sealing performance of the cross wall of the rotary door, but also the sealing performances of the fan-shaped side walls of the rotary door, which extend in both sides from the cross wall of the rotary door (three-direction sealing). Therefore, when the fan-shaped side walls are set such that the lower side is short and the upper side is long, the rotation angle of the rotary door is limited to an angle which does not exceed the second foot opening seal face.

On the other hand, in the foot door 31 according to Embodiment 1, the sealing face distances are set to establish the relationship of L1>L3>L2 (refer to FIG. 7), and the sealing face widths are set to establish the relationship of W1>W3>W2 (refer to FIG. 8). Consequently, regarding the rotation angle of the foot door 31 from the withdrawal position to the advanced position, it is set to obtain an angle which exceeds the second foot opening seal face 22b as illustrated in FIGS. 2-4.

Accordingly, when the foot outlet is opened (when the foot door 31 is located in the advanced position), the foot door 31 can distribute, via the space formed between the foot door 31 and the second foot opening seal face 22b, the air to the vent outlet and the def outlet which are disposed in the upper side of the space.

[Heat Pick-Up Improvement Function in Full Cool Mode]

When the vent mode is selected in the full cool mode, the upstream side of the foot outlet is closed by the foot door 31 in the withdrawal position, and the foot door 31 does not protrude to the cold air path 28. Accordingly, compared with a case in which the door which closes the foot discharge path 33 and the foot discharge opening 161 is additionally disposed, the structure of the device can be downsized and the manufacturing costs can be controlled by reducing the number of parts. In addition, since the foot door 31 does not protrude to the cold air path 28, the air flow resistance can be reduced when the vent mode is selected.

However, as in Embodiment 1, when the door space of the foot door 31 is used as the air passageway, a heat pick-up phenomenon in which the cold air flowing via the cold air path 28 from the evaporator 26 draws the warm air remaining around the heater core 30 is caused when the vent mode is selected in the full cool mode. As a measure for preventing this heat pick-up phenomenon, a measure for disposing in the foot door 31 another door which blocks the drawing of the warm air, or a measure for disposing a warm water valve which stops supplying the warm water to the heater core 30 is considered. However, if these measures are taken, the number of parts, the space and the costs are increased.

On the other hand, in Embodiment 1, the heat pick-up phenomenon can be remedied without using another door, the warm water valve or the like when the vent mode is selected in the full cool mode.

More particularly, in Embodiment 1, the warm air path blocking plate 41 which closes a part of the warm air passageway is integrally formed with the foot door 31. Therefore, a part of the warm air remaining around the heater core 30 is drawn to the cold air path 28 from the opening section of the foot door 31, but the remaining warm air is prevented from being drawn into the cold air path 28 by the warm air path blocking plate 41, and remains in the upper portion of the heater core 30 (refer to the dotted line arrow in FIG. 1). For this reason, when the vent mode is selected in the full cool mode, the heat pick-up phenomenon which increases the blowing temperature can be remedied without using another door, the warm water valve, or the like.

Figure 9:
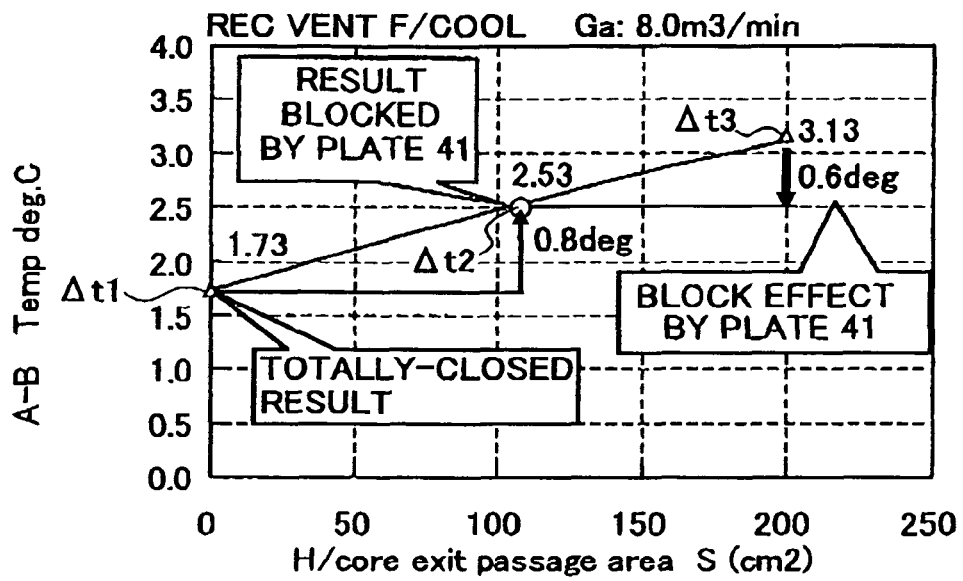
FIG. 9 is a comparative characteristic view of a temperature difference (A–B) relative to an exit passage area of a heater core when the vent mode is selected in full cool mode by internal air circulation, which illustrates an experimental result for confirming a heat pickup improvement effect in Embodiment 1.
Figure 10:
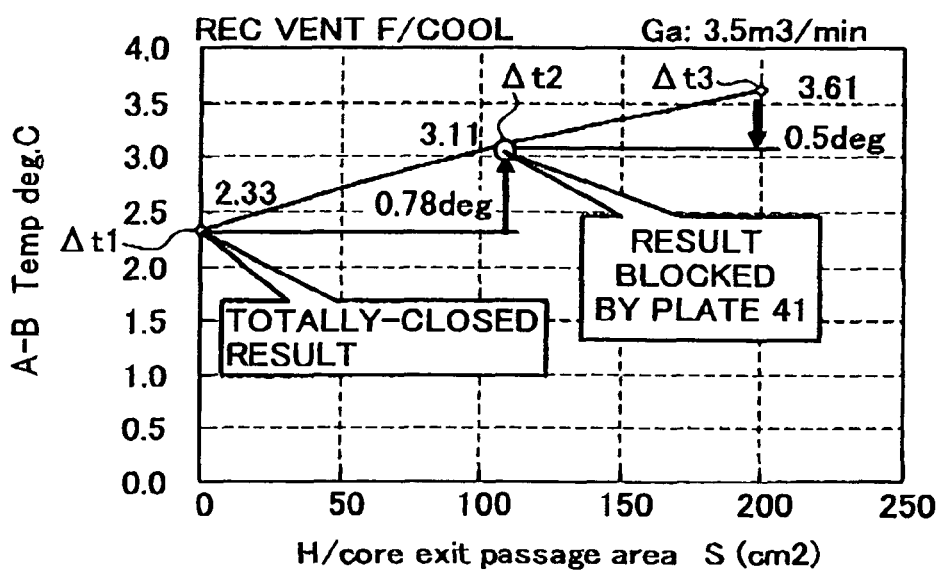
FIG. 10 is a comparative characteristic view of a temperature difference (A–B) relative to an exit passage area of the heater core when the vent mode is selected in full cool mode by internal air circulation, which illustrates an experimental result for confirming a heat pickup improvement effect in Embodiment 1.

FIGS. 9, 10 are comparative characteristic views each illustrating a temperature difference (A−B) relative to an exit passage area of the heater core 30 when the vent mode is selected in the full cool mode by the internal air circulation. In addition, A denotes the average temperature of the vent outlet, and B denotes the average temperature of the evaporator exit. As to the experiment conditions, the temperature just after the evaporator=0° C., the temperature just after the heater core=82° C., the blast volume of the fan=10 L/min, and the external air temperature=about 25° C.

As illustrated in FIG. 9, as to the experiment results in the blowing flow rate Ga=8.0 m³/min, the result (temperature difference) with the exit passage area of the heater core 30 entirely closed is Δt1=1.73° C., the result (temperature difference) with the exit passage area of the heater core 30 blocked by the warm air path blocking plate 41 is Δt2=2.53° C., and the result (temperature difference) with the exit passage area of the heater core 30 entirely opened is Δt3=3.13° C. By this experiment, compared with a case in which the exit passage area of the heater core 30 is entirely opened, the improvement effects of 0.6° C. (=3.13−2.53) can be obtained by blocking the exit passage area of the heater core 30 with the warm air path blocking plate 41.

As illustrated in FIG. 10, as to the experiment results in the blowing flow rate Ga=3.5 m³/min, the result (temperature difference) with the exit passage area of the heater core 30 entirely closed is Δt1=2.33° C., the results (temperature difference) with the exit passage area of the heater core 30 blocked by the warm air path blocking plate 41 is Δt2=3.11° C., and the result (temperature difference) with the exit passage area of the heater core 30 entirely opened is Δt3=3.61° C. By this experiment, compared with a case in which the exit passage area of the heater core 30 is entirely opened, the improvement effects of 0.5° C. (=3.61−3.11) can be obtained by blocking the exit passage area of the hater core 30 with the warm air path blocking plate 41.

Next the effects will be described.

In the automotive air conditioner 1A according to Embodiment 1, the following effects can be obtained.

(1) The automotive air conditioner includes the air-conditioning case 22 in which the air passageways having the cold air path 28 via the evaporator 26, the warm air path 29 via the heater core 30, and a plurality of discharge path systems 32, 33 communicating with the outlets, respectively, are formed, the air mix door 71, 72 which distributes the cold air and the warm air by an opening degree to each of the discharge path systems 32, 33 via the junction region J of the cold air and the warm air, and the rotary door 31 having the cross wall 31b, which is rotatably disposed in the junction region J of the cold air and the warm air and blocks the air flow from the junction region J to the downstream side by the cross wall 31b in the advanced position. The rotary door 31 and the air mix door 71, 72 include the overlap layout which uses the door space inside the cross wall 31b of the rotary door 31 in the advanced position as the opening and closing operation space of the air mix door 71, 72. Accordingly, the demand for downsizing the air-conditioning case 22 can be met while achieving the improvement in the air mixing performance of the cold air and the warm air.

(2) The rotary door 31 is the foot door which blocks the foot discharge path system 33, 161 by the cross wall 31b in the withdrawal position, blocks the air flow from the junction region J to the downstream side by the cross wall 31b in the advanced position, and uses the door space as the path of the cold air and the path of the warm air. The air mix door is the cold air side air mix door 71 which controls the opening area of the cold air path 28 via the evaporator 26, and the foot door 31 and the cold air side air mix door 71 are disposed such that a part of the cold air side air mix door 71 by the opening degree on the open side overlaps with the door space surrounded by the door shaft 31a, a pair of side walls 31c, 31c and the cross wall 31b of the foot door 31 in the advanced position. Accordingly, since the rotary door has the function as the foot door, the number of the parts can be reduced without disposing the foot door in addition to the rotary door, and the air-conditioning case 22 can be further downsized.

(3) In the rotary door 31, the seal face distance L2 from the door shaft 31a to the end portion of the circumference direction in the front side of the advanced direction is shorter than the seal face distance L1 from the door shaft 31a to the end portion of the circumference direction in the tip side of the advanced direction, and the seal face width W2 in the end portion of the circumference direction in the front side of the advanced direction is shorter than the seal face width W1 in the end portion of the circumference direction in the tip side of the advanced direction. Accordingly, the rotation angle of the rotary door 31 can be increased, thus, the air passageways to the vent outlet and the def outlet in the advanced position of the rotary door can be appropriately retained to a high setting degree.

(4) The downstream position of the heater core 30 is provided with the warm air path blocking plate 41 which blocks a part of the warm air path 29 in a state in which at least the rotary door 31 is located in the withdrawal position. Accordingly, in the withdrawal position of the rotary door 31, the heat pick-up phenomenon can be remedied without providing another door, the warm water valve or the like.

(5) Since the warm air path blocking plate 41 is integrally formed with the rotary door 31, the heat pick-up phenomenon can be improved in the withdrawal position of the rotary door 31 by a simple structure which does not increase the number of parts.

(6) The rotary door 31 includes a pair of side walls 31c, 31c parallel to each other each having an approximately fan shape, the cross wall 31b which connects the outer circumference edges of the side walls 31c, 31c, and the door shaft 31a which is located in the position which is the base of the fan shape of the side wall 31c, and the rotary door 31 rotates centering on the door shaft 31a rotatably supported to the air-conditioning case 22. The warm air path blocking plate 41 is set in the position for covering a part of the region of the warm air path in which the three directions are surrounded by the side walls 31c, 31c and the cross wall 31b of the front side of the advanced direction of the rotary door 31. Accordingly, since the rotary door 31 in the advanced position guides the cold air to the warm air side, the air mixing performance can be improved, and the heat pick-up can be improved in the withdrawal position of the rotary door 31.

Embodiment 2

Embodiment 2 is an example in which a warm air path blocking plate for blocking a part of the warm air passageway in a state in which at least the foot door 31 is in the withdrawal position is integrally formed with the air-conditioning case At first, the structure will be described with reference to FIGS. 11, 12.

Figure 11:
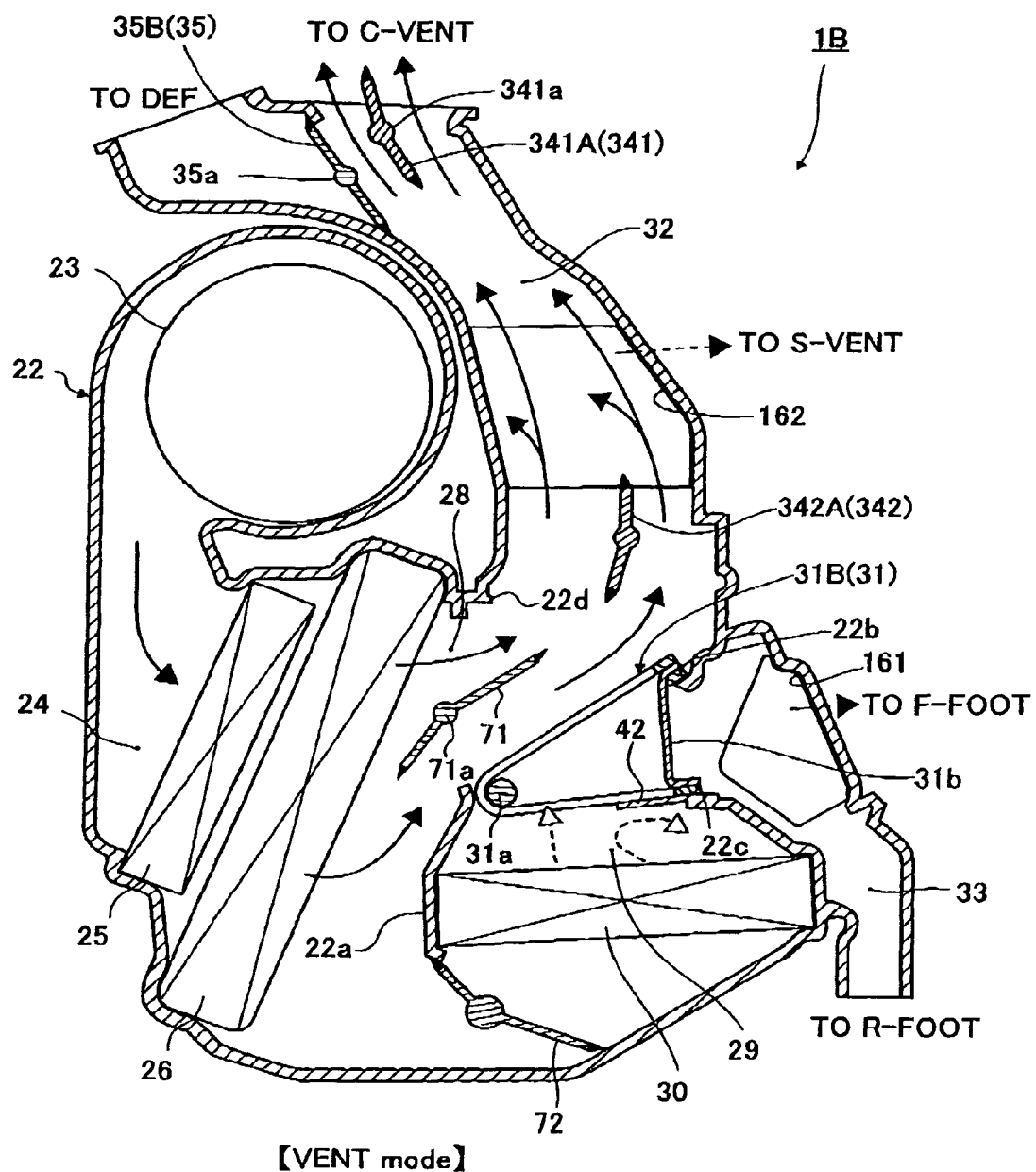
FIG. 11 is a vertical sectional view illustrating a vent mode which blows out air from a center vent outlet and a side outlet in an automotive air conditioner of Embodiment 2.
Figure 12:
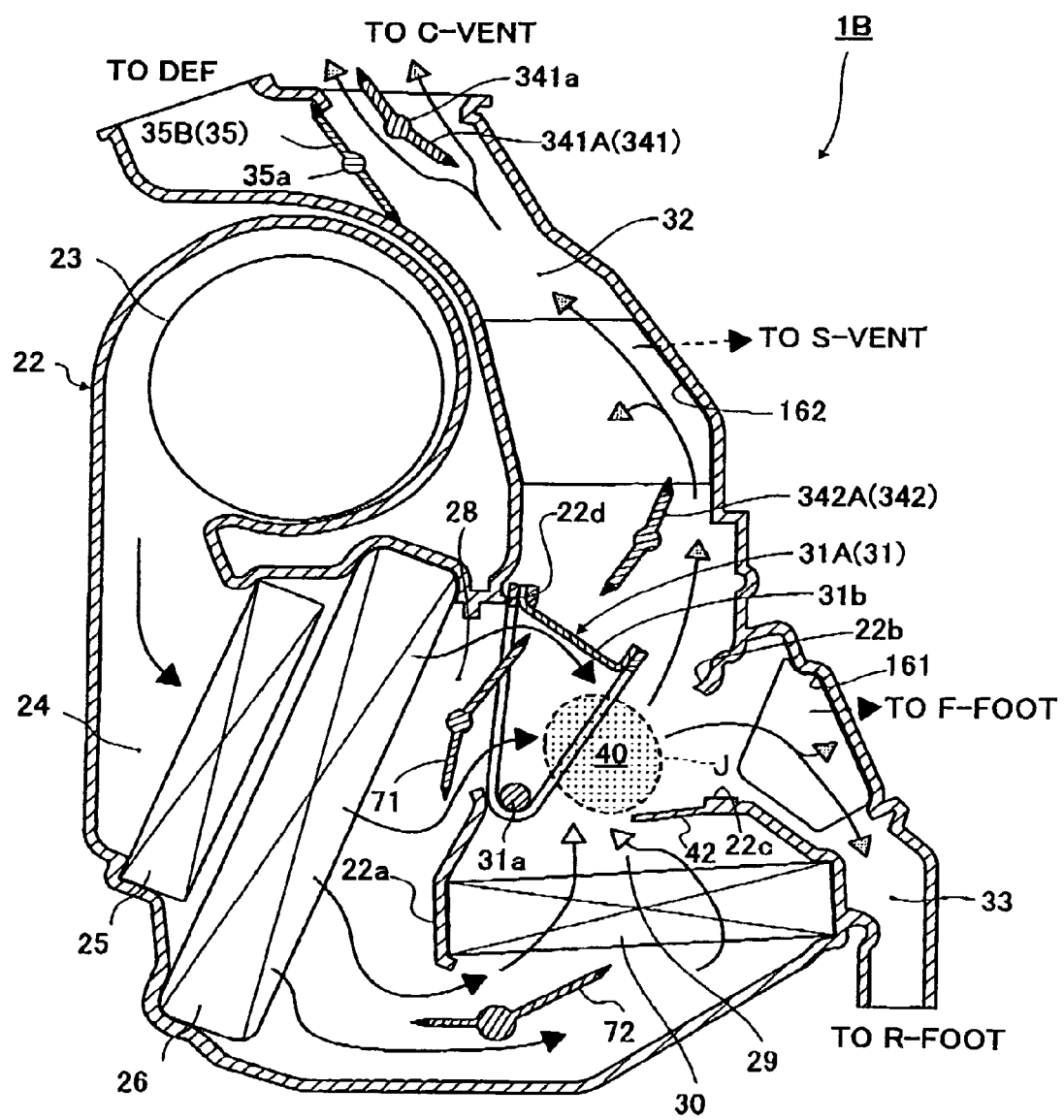
FIG. 12 is a vertical sectional view illustrating a B/L mode which blows out air from both of a vent outlet and a foot outlet in the automotive air conditioner of Embodiment 2.

A warm air path blocking plate 42 in an automotive air conditioner 1B according to Embodiment 2 is integrally formed with an air-conditioning case 22 as illustrated in FIGS. 11, 12, relative to the warm air path blocking plate 41 according to Embodiment 1 integrally formed with the foot door 31. More particularly, the warm air blocking plate 42 is integrally formed to extend from the end portion of a first foot opening seal face 22c of the air-conditioning case 22 with which a sealing face 37a in the end portion of the circumference direction in the front side of the withdrawal direction of the foot door 31 has contact. In addition, other structures are the same as the structures of Embodiment 1, therefore, the same reference numbers are applied to the corresponding structures for omitting the descriptions.

Next, the function will be described.

In Embodiment 2, similar to Embodiment 1, the heat pickup phenomenon can be remedied without using another door, the warm water valve, or the like when the vent mode is selected in the full cool mode. Namely, in Embodiment 2, the warm air path blocking plate 42 which closes a part of the warm air path is integrally formed with the air-conditioning case 22. Therefore, as illustrated by the dotted arrow in FIG. 11, a part of the warm air remaining around the heater core 30 is drawn to the cold air path 28 from the opening portion of the foot door 31, the drawing of the remaining warm air to the cold air path 28 is blocked by the warm air path blocking plate 42, and the remaining warm air remains in the upper portion of the heater core 30.

In Embodiment 2, as illustrated in FIG. 12, when the B/L mode is selected, the cross wall 31b of the foot door 31 protrudes to the air-mixing chamber 40 in which the cold air is mixed with the warm air. Accordingly, the cold air is prevented from flowing through the vent outlet and the def outlet disposed in the upper portion of the air-conditioning case 22 without being mixed with the warm air, thus, the air mixing effect can be obtained. In addition, by adding the warm air path blocking plate 42 to the air-conditioning case 22, the warm air path blocking plate 42 guides the warm air to the upstream side of the junction region J (=air mixing chamber 40), so as to improve the air-mixing performance. In addition, the descriptions of other functions will be omitted because they are similar to the descriptions in Embodiment 1.

Next, the effects will be described.

In the automotive air-conditioner 1B according to Embodiment 2, the following effects can be obtained in addition to the effects of (1) to (4) in Embodiment 1.

(7) Since the warm air path blocking plate 41 is integrally formed with the air-conditioning case 22, the heat pick-up phenomenon can be improved in the withdrawal position of the rotary door 31 by a simple structure which does not increase the number of parts.

(8) The warm air path blocking plate 42 is integrally formed to extend from the end portion of the first foot opening seal face 22c of the air conditioning case 22 with which the seal face 37a in the end portion of the circumference direction in the front side the advanced direction of the rotary door 31 has contact. Accordingly, since the rotary door 31 guides the warm air to the upstream side in the advanced position, the air mixing performance can be improved, and the heat pick-up phenomenon can be improved in the withdrawal position of the rotary door 31.

Embodiment 3

Embodiment 3 is an example in which a warm air path blocking door is provided for a higher heat pick-up improvement performance, in addition to the structure of Embodiment 1.

Figure 13:
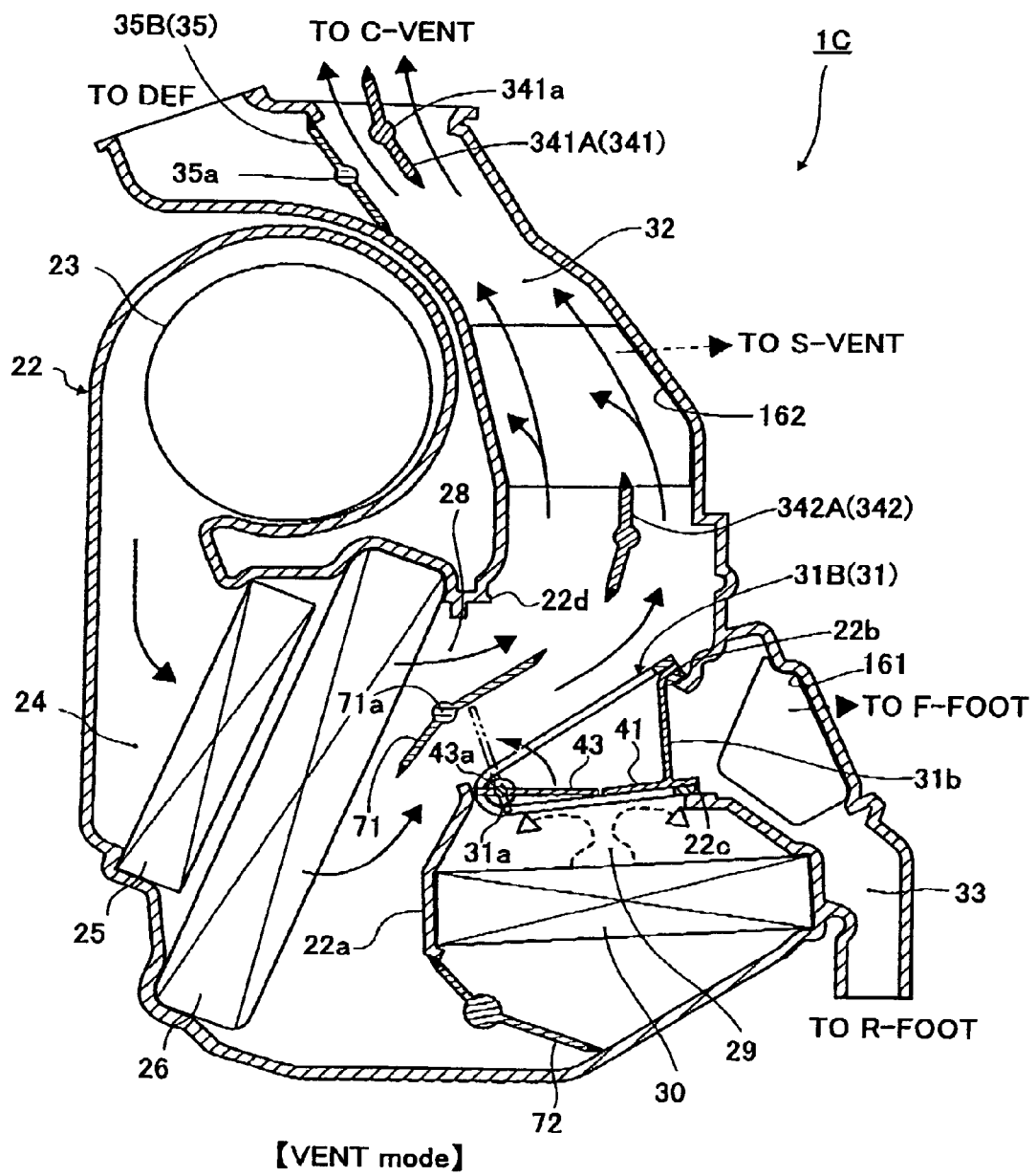
FIG. 13 is a vertical sectional view illustrating a vent mode which blows out air from a center vent outlet and a side vent outlet in an automotive air conditioner of Embodiment 3.

At first, the structure will be described with reference to FIG. 13.

In an automotive air conditioner 1C according to Embodiment 3, the door shaft 31a of the foot door 31 includes concentric double shafts. One shaft 43a of the concentric double shafts is provided with a warm air path blocking door 43 for blocking the opening space of the warm air path, which is not blocked by the warm air path blocking plate 41 when the door is closed (when the vent mode is selected in the full cool mode), and for opening the opening space of the warm air path when the door is open (except when the vent mode is selected in the full cool mode). In addition, other structures of Embodiment 2 are similar to the structures of Embodiment 1, so the same reference numbers are given to the corresponding structures to omit the descriptions.

Next, the function will be described.

In Embodiment 3, when the vent mode is selected in the full cool mode, the heat pick-up phenomenon can be significantly remedied by using both of the warm air path blocking plate 41 and the warm air path blocking door 43.

Figure 14:
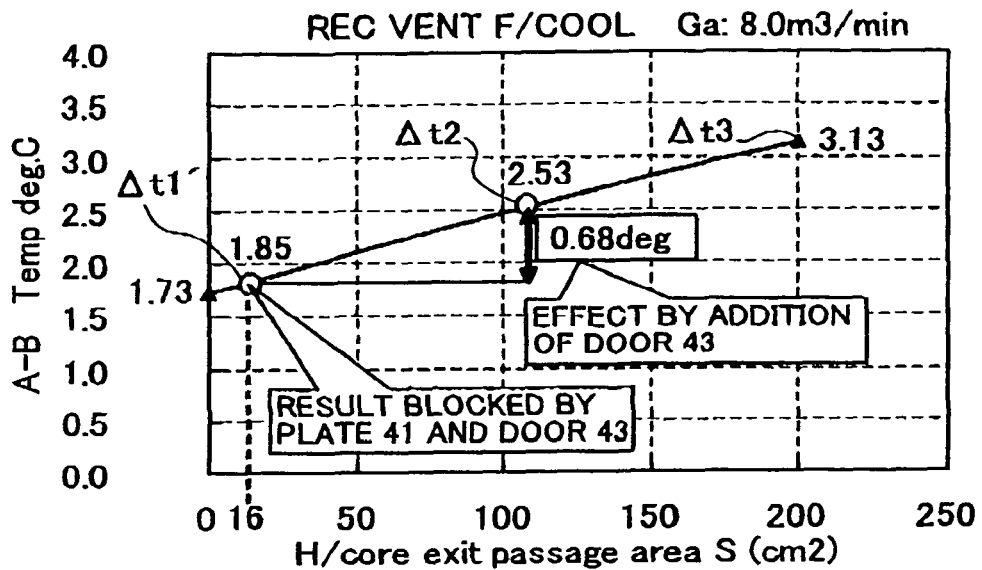
FIG. 14 is a comparative characteristic view of a temperature difference (A–B) relative to an exit passage area of a heater core when a vent mode is selected in full cool mode by internal air circulation, which is an experimental result for confirming a heat pickup improvement effect in Embodiment 3.
Figure 15:
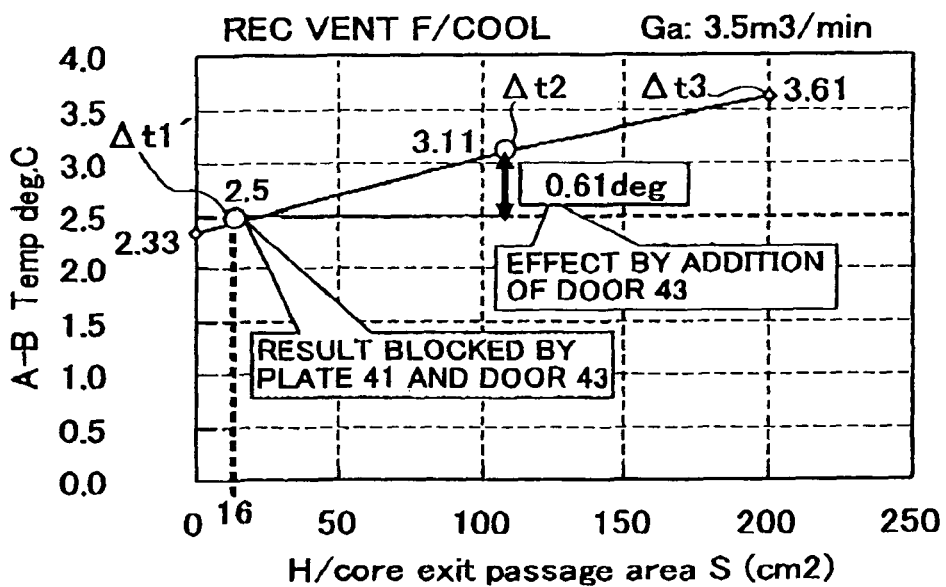
FIG. 15 is a comparative characteristic view of a temperature difference (A–B) relative to an exit passage area of the heater core when the vent mode is selected in full cool mode by internal air circulation, which is an experimental result for confirming a heat pickup improvement effect in Embodiment 3.

FIGS. 14, 15 are comparative characteristic views each illustrating a temperature difference (A–B) relative to an exit passage area of the heater core 30 when the vent mode is selected in the full cool mode by the internal air circulation. In addition, A denotes the average temperature of the vent outlet and B denotes the average temperature of the evaporator exit. As to the experiment conditions, the temperature just after the evaporator=0° C., the temperature just after the heater core=82° C., the blast volume of the fan=10 L/min, and the external air temperature=about 25° C.

As illustrated in FIG. 14, as to the experiment results in the blowing flow rate Ga=8.0 m$^3$/min, the result (temperature difference) with the exit passage area of the heater core 30 blocked with the warm air path blocking plate 41 and the warm air path blocking door 43 is $\Delta t1'$=1.85° C., the result (temperature difference) with the exit passage area of the heater core 30 blocked only by the warm air path blocking plate 41 is $\Delta t2$=2.53° C., and the result (temperature difference) with the exit passage area of the heater core 30 entirely opened is $\Delta t3$=3.13° C. By this experiment, compared with a case in which the exit passage area of the heater core 30 is blocked only by the warm air path blocking plate 41, the improved effects of 0.68° C. (=2.53−1.85) can be obtained by blocking the exit passage area of the heater core 30 with the warm air path blocking plate 41 and the warm air path blocking door 43. In addition, compared with a case in which the exit passage area of the heater core 30 is entirely opened, the improved effects of 1.28° C. (=0.6+0.68) can be obtained.

As illustrated in FIG. 15, as to the experiment results in the blowing flow rate Ga=3.5 m$^3$/min, the result with the exit passage area of the heater core 30 blocked with the warm air path blocking plate 41 and the warm air path blocking door 43 is $\Delta t1'$=2.5° C., the result (temperature difference) with the exit passage area of the heater core 30 blocked only with the warm air path blocking plate 41 is $\Delta t2$=3.11° C., and the result (temperature difference) with the exit passage area of the heater core 30 entirely opened is $\Delta t3$=3.61° C. By this experiment, compared with a case in which the exit passage area of the heater core 30 is blocked only by the warm air path blocking plate 41, the improved effects of 0.61° C. (=3.11−2.5) can be obtained by blocking the exit passage area of the heater core 30 with the warm air path blocking plate 41 and the warm air path blocking plate 41. In addition, the improved effects of 1.11° C. (=0.5+0.61) can be obtained, compared with a case in which the exit passage area of the heater core 30 is entirely opened.

Next, the effects will be described.

In the automotive air conditioner 1C according to Embodiment 3, the following effects can be obtained in addition to the effects (1) to (6) of Embodiment 1.

(9) The door shaft 31a of the rotary door 31 includes the concentric double shafts, and one of the concentric double shafts is provided with the warm air path blocking door 43 for blocking the opening space of the warm air path, which is not blocked by the warm air path blocking plate 41 when the door is closed, and for opening the opening space of the warm air path when the door is opened. Accordingly, when the vent mode is selected in the full cool mode, the heat pick-up phenomenon can be significantly remedied.

As described above, in the automotive air conditioner according to one embodiment of the present invention, in the air passageways of the air-conditioning case, the cold air from the cold air path via the evaporator is mixed with the warm air from the warm air path via the heater core in the junction region, the air in which the temperature is adjusted flows in each of the discharge path systems via the junction region, and blows out into the vehicle interior from each of the outlets communicating with each of the discharge path systems. When the temperature adjusted air blows out, if the rotary door is located in the advanced position, the mixture of the cold air from the cold air path to the junction region with the warm air from the warm air path is carried out by blocking the air flow from the junction region to the downstream side with the cross wall of the rotary door. In addition, the rotary door and the air mix door include the overlap layout which uses the door space inside the cross wall of the rotary door in the advanced position as the opening and closing operation space of the air mix door. Therefore, when designing the air-conditioning case, the limitation of the layout for the two doors is relaxed, and the distance between the shafts of the two doors can be reduced. As a result, the air conditioning case can be downsized while improving the air mixing performance of the cold air and the warm air.

As described above, although the present invention has been described in terms of Embodiments 1-3, it is not limited thereto. It should be appreciated that variations may be made in the embodiments described by persons skilled in the art without departing from the scope of the present invention as defined by the following claims.

For example, the rotary door is disposed as the foot door, but it can be disposed as a dedicated door. When the rotary door is disposed as the dedicated door, the withdrawal position of the rotary door can be set in another position such as a position along the cross wall of the air-conditioning case of the evaporator side. In addition, as the cross section shape of the cross wall of the rotary door, the flat plate is illustrated, but an approximately circular arc shape or another cross section shape can be used.

Namely, as long as the rotatable rotary door, which blocks the air flow from the junction region to the downstream side by the cross wall in the advanced position, is provided in the junction region of the cold air and the warm air, and the rotary door and the air mix door include the overlap layout which uses the door space inside the cross wall of the rotary door in the advanced position as the opening and closing operation space of the air mix door, the invention is not limited to Embodiments 1-3.

What is claimed is:

1. An automotive air conditioner, comprising:
    an air-conditioning case having air passageways including a cold air path through an evaporator, a warm air path through a heater core, and a plurality of discharge paths communicating with respective outlets;
    an adjustable air mix door for adjusting a distribution of cold air and warm air flowing into said discharge paths through a junction region of the cold air and the warm air by adjusting an amount of opening of said cold air path and said warm air path; and
    a wedge-shaped rotary door having a pair of side walls and a cross wall connecting distal ends of said side walls, said rotary door being rotatable about an axis connecting base ends of said side walls, said rotary door being rotatable between a withdrawal position and an advanced position, in which said cross wall impedes air flow from said junction region to an area downstream of said junction region;
    wherein said rotary door has a door space formed within and defined by said side walls and said cross wall of said rotary door, said air mix door and said rotary door being arranged and configured so that a portion of an opening-and-closing space of said air mix door overlaps with said door space of said rotary door when said rotary door is in the advanced position such that a portion of said air mix door is located within said door space when said rotary door is in the advanced position and said air mix door is open at least a minimal amount;
    wherein said rotary door is configured so that said door space forms a portion of said cold air path and a portion of said warm air path; and
    wherein a seal face distance of said rotary door from a door shaft of said rotary door to said cross wall at a front side of said rotary door is shorter than a seal face distance of said rotary door from said door shaft to said cross wall at a tip side of said rotary door, and a seal face width of said cross wall at said front side is shorter than a seal face width of said cross wall at said tip side.

2. The automotive air conditioner of claim 1, wherein said air mix door is located between said evaporator and said heater core with respect to a direction of air flow through said evaporator.

3. The automotive air conditioner of claim 1, wherein said air mix door comprises a cold-air-side air mix door, said automotive air conditioner further comprising a warm-air-side air mix door.

4. The automotive air conditioner of claim 3, wherein each of said cold-air-side air mix door and said warm-air-side air mix door is located between said evaporator and said heater core with respect to a direction of air flow through said evaporator.

5. The automotive air conditioner of claim 1, wherein said rotary door comprises a foot door configured so that said cross wall blocks a foot discharge path system when said rotary door is in the withdrawal position, and blocks the air flow from said junction region to said area downstream of said junction region when said rotary door is in the advanced position; and
    wherein said air mix door comprises a cold-air-side air mix door for controlling an opening area of said cold air path through said evaporator.

6. The automotive air conditioner of claim 1, further comprising a warm air path blocking plate downstream of said heater core, said warm air path blocking plate being configured to block a portion of the warm air path.

7. The automotive air conditioner of claim 6, wherein said warm air path blocking plate is integrally formed with said rotary door.

8. The automotive air conditioner of claim 7, wherein each of said side walls of said rotary door is approximately fan-shaped, and said rotary door includes a door shaft located at said axis connecting said base ends of side walls, said rotary door rotates about said door shaft, said door shaft being rotatably supported to said air-conditioning case; and
    said warm air path blocking plate is arranged to cover a part of said door space so as to be surrounded by and connected to each of said side walls and to said cross wall at a front side of said rotary door.

9. The automotive air conditioner of claim 8, wherein said door shaft of said rotary door comprises concentric double shafts, a first one of said concentric double shafts having a warm air path blocking door for blocking a portion of the warm air path not blocked by said warm air path blocking plate when said rotary door is closed, and for opening said portion of the warm air path not blocked by said warm air path blocking plate when said rotary door is opened.

10. The automotive air conditioner of claim 6, wherein said warm air path blocking plate is integrally formed with said air-conditioning case.

11. The automotive air conditioner of claim 10, wherein said warm air path blocking plate is configured to extend from an end portion of a first foot opening seal face of said air conditioning case, said first foot opening seal face being configured to contact an end portion of a seal face at a front side of said rotary door when said rotary door is in the withdrawal position.

* * * * *